(12) United States Patent
Lee et al.

(10) Patent No.: US 10,012,268 B1
(45) Date of Patent: Jul. 3, 2018

(54) TORQUE LIMITING WEDGE CLUTCH

(71) Applicant: SCHAEFFLER TECHNOLOGIES AG & CO. KG, Herzogenaurach (DE)

(72) Inventors: Brian Lee, York, SC (US); Carsten Ohr, Charlotte, NC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/388,239

(22) Filed: Dec. 22, 2016

(51) Int. Cl.
F16D 7/02 (2006.01)
F16D 13/16 (2006.01)
F16D 13/64 (2006.01)
F16D 13/66 (2006.01)

(52) U.S. Cl.
CPC ............ *F16D 7/028* (2013.01); *F16D 13/16* (2013.01); *F16D 13/644* (2013.01); *F16D 13/66* (2013.01)

(58) Field of Classification Search
CPC ......... F16D 7/028; F16D 13/16; F16D 13/644
See application file for complete search history.

(56) References Cited

U.S. PATENT DOCUMENTS

| | | | |
|---|---|---|---|
| 9,644,690 B2* | 5/2017 | Lee | F16D 43/00 |
| 2014/0014455 A1* | 1/2014 | Davis | F16D 41/063 |
| | | | 192/45.1 |
| 2014/0110207 A1* | 4/2014 | Davis | F16D 41/08 |
| | | | 192/45.1 |
| 2015/0014113 A1 | 1/2015 | Ohr et al. | |
| 2015/0083539 A1 | 3/2015 | Lee et al. | |
| 2015/0152921 A1 | 6/2015 | Lee | |
| 2015/0152922 A1* | 6/2015 | Lee | F16D 13/14 |
| | | | 192/66.1 |
| 2016/0084326 A1 | 3/2016 | Ramsey | |

OTHER PUBLICATIONS

Lee, Brian, "AWD Disconnect, Escaping the clutches of the dog", Schaeffler Symposium 2014, 26 pages.

* cited by examiner

*Primary Examiner* — Jacob S. Scott
*Assistant Examiner* — Tinh Dang
(74) *Attorney, Agent, or Firm* — Brooks Kushman P.C.

(57) ABSTRACT

A clutch includes a hub and a carrier supported for rotation about a common axis. The carrier has a fixed portion and a sliding member that cooperate to define a groove. Movement of the sliding member changes a width of the groove. The clutch further includes a disk having a first edge disposed on the hub and a second edge disposed in the groove. The disk frictionally engages between the hub and the carrier when the clutch is locked. The sliding member is biased such that the groove has a first width for a first range of torques between the disk and the groove and a second width that is greater than the first width for a second range of torques between the disk and the groove that is greater than the first range of torques.

19 Claims, 4 Drawing Sheets

US 10,012,268 B1

TORQUE LIMITING WEDGE CLUTCH

TECHNICAL FIELD

The present disclosure relates to a wedge clutch for selectively coupling two or more powertrain components to each other.

BACKGROUND

A vehicle powertrain may include a wedge clutch for coupling an input shaft to an output shaft. The wedge clutch includes an inner race connected to one of the shafts and an outer race connected to the other of the shafts. A wedge plate is radially disposed between the inner and outer races and is configured to engage the inner and outer races when the clutch is locked to transmit power from the input shaft to the output shaft.

SUMMARY

According to one embodiment, a clutch includes a hub and a carrier supported for rotation about a common axis. The carrier has a fixed portion and a sliding member that cooperate to define a groove. Movement of the sliding member changes a width of the groove. The clutch further includes a disk having a first edge disposed on the hub and a second edge disposed in the groove. The disk frictionally engages between the hub and the carrier when the clutch is locked. The sliding member is biased such that the groove has a first width for a first range of torques between the disk and the groove and a second width that is greater than the first width for a second range of torques between the disk and the groove that is greater than the first range of torques.

According to another embodiment, a clutch includes a first race supported for rotation about an axis and a second race supported for rotation about the axis. An annular member of the clutch is slidably seated against the first race. The first race and the annular member each define an opposing surface, and the opposing surfaces cooperate to define a groove circumscribing the first race. The annular member is operable to slide along the first race to change a width of the groove. A disk of the clutch is radially disposed between the first and second races and includes a first edge disposed in the groove to frictionally engage the groove when the clutch is locked.

According to yet another embodiment, a clutch includes a hub and a carrier supported for rotation about a common axis. The carrier has an outer axially extending portion and an inner axially extending portion spaced apart to define a pocket. The outer portion defines a first chamfered surface. A sliding element is disposed in the pocket against the outer portion and defines a second chamfered surface that cooperates with the first chamfered surface to define a groove facing the hub. The sliding element is axially slidable relative to the outer portion to increase or decrease a width of the groove. A resilient member is radially disposed between the sliding element and the inner portion and biases the first and second chamfered surfaces together. A wedge plate is radially disposed between the hub and the groove. During operation of the clutch, the sliding element slides away from the first chamfered surface in response to a force between the second chamfered surface and the wedge plate exceeding a force of the resilient member permitting slip between the carrier and the wedge plate to limit torque transfer between the hub and the carrier.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
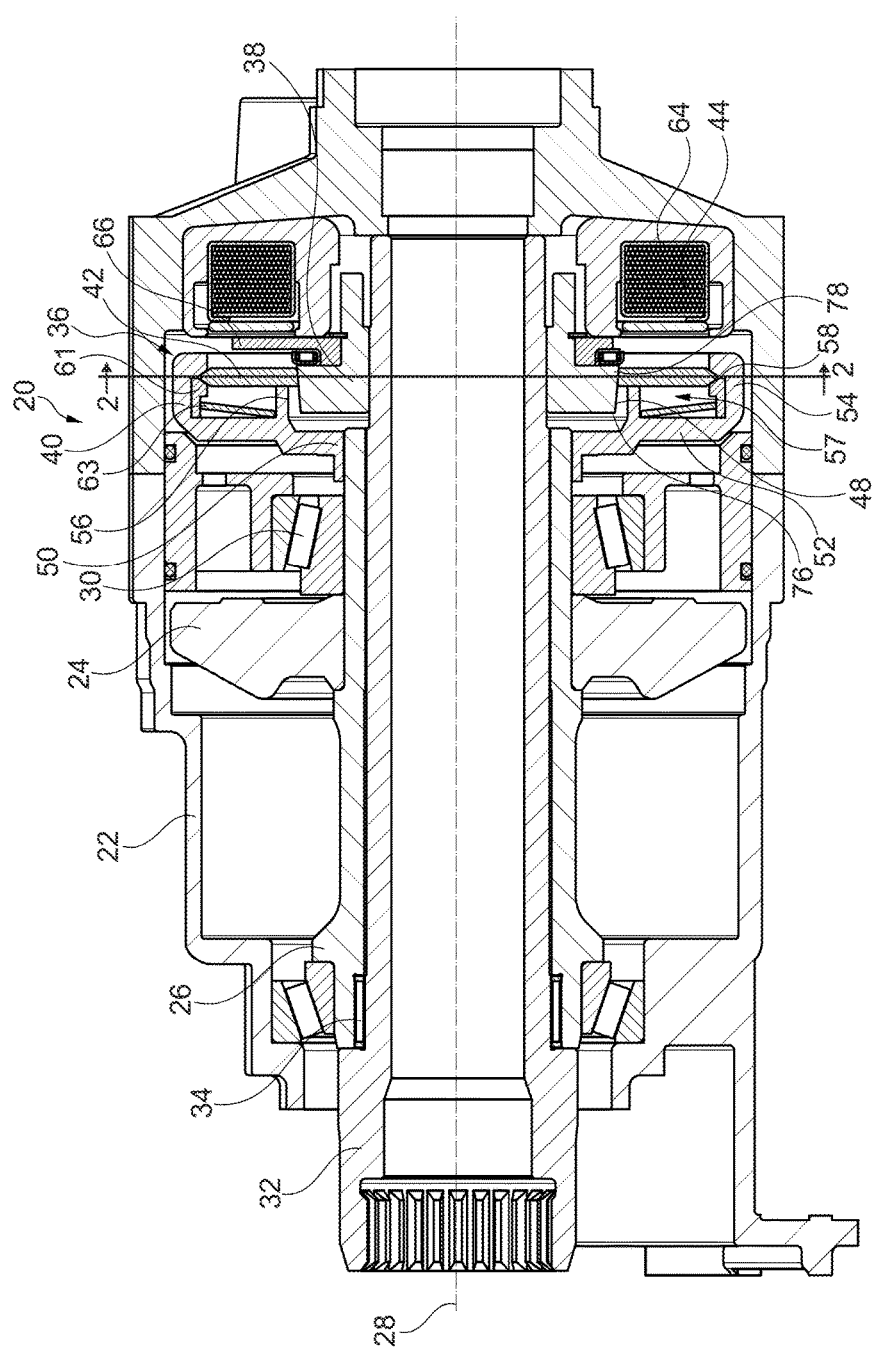
FIG. 1 is a side cross-sectional view of a power transfer unit having a wedge clutch according to one embodiment.
Figure 2:
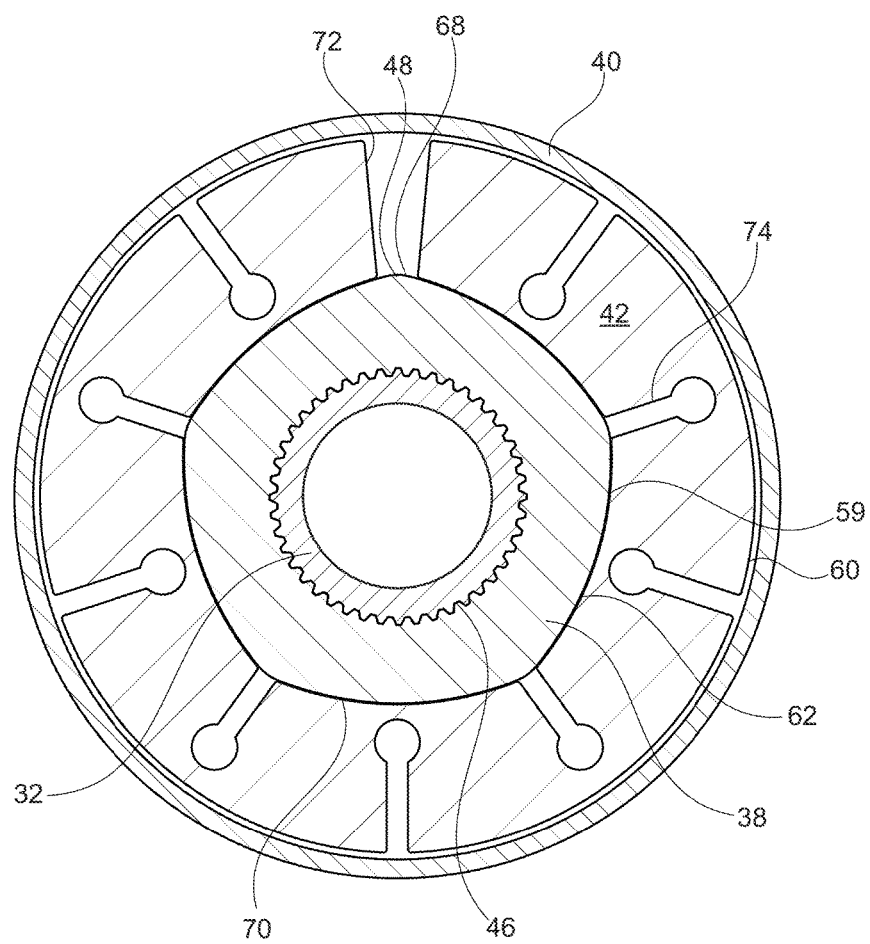
FIG. 2 is a partial cross-sectional view of the clutch taken along line 2-2.

Referring to FIGS. 1 and 2, a power-transfer unit 20 (PTU) for a powertrain is shown. The PTU 20 may be for an all-wheel-drive motor vehicle such as a passenger car or truck. The PTU 20 includes a housing 22 that supports an input shaft 26 for rotation about an axis 28 via bearings 30. A gear 24 may be fixed to the input shaft 26 by a spline connection. The gear 24 may be driveably connected to a transmission output shaft. Two components are driveably connected if they are connected by a power flow path that constrains their rotational speeds to be directly proportional. An output shaft 32 is disposed in the housing 22 and is supported for rotation about the axis 28 via bearings 34.

A wedge clutch 36 is disposed in the housing 22 and selectively couples the input shaft 26 to the output shaft 32 to transfer torque from the input shaft 26 to the output shaft 32. The clutch 36 has a closed state (also referred to as a locked state) in which the input and output shafts are coupled to each other and an open state (also referred to as an unlocked state) in which the input and output shafts are independently rotatable relative to each other. The wedge clutch 36 may include a hub 38 (which may be referred to as an inner race), a carrier 40, and a disk 42 (which may be referred to as a wedge plate) that are all supported for rotation about the axis 28.

The hub 38 includes an inner surface 46 connected to the output shaft 32 and an outer ramped surface 48. The carrier 40 includes a base 50 connected to the input shaft 26, a radially extending portion 52, and an axially extending portion 54 (which may be referred to as an outer race). A projection 56 extends axially from the radially extending portion 52 and cooperates with the axially extending portion 54 to define a pocket 57 recessed into the carrier 40.

The disk 42 is radially disposed between the hub 38 and the axially extending portion 54. An inner edge 59 of the disk 42 defines a generally circular opening 62 that receives the hub 38 and is seated on the ramped surface 48. An outer edge 60 of the disk 42 is disposed in a groove 58 of the carrier 40. When the clutch 36 is locked, the outer edge 60 frictionally engages with the groove 58 and the inner edge 59 frictionally engages with the ramped surface 48 to couple the carrier 40 to the hub 38 creating a power flow path between the input shaft 26 and the output shaft 32.

An actuator 44 moves the clutch between the open and closed states. The actuator 44 may be an electric actuator, as shown, or may be a hydraulic or mechanical actuator. In one embodiment, the electric actuator 44 includes electric coils 64 and an armature 66. The armature 66 is connected to the hub 38 and slides the hub towards the carrier 40 or away from the carrier 40, depending upon an energization state of the coils 64, to operate the clutch. In other embodiments, the actuator is energized to close the clutch and a spring biases the clutch to an open state.

The ramped surface 48 of the hub is not a perfect circle and includes cams 68 that ramp radially outward from the center of the hub. The cams 68 cooperate with cams 70 on the inner edge 59 of the disk 42 to force the disk 42 radially outward to engage with the axially extending portion 54 when the clutch is locked. The disk 42 may have a slot 72 that extends completely through the disk 42 and slots 74 that extend partially through the disk. The slots facilitate radial expansion of the disk 42. In other embodiments, the disk 42 may include multiple segments retained together by an annular resilient member such as a snap ring.

In FIG. 2, the clutch 36 is illustrated in the open state with the disk 42 being near a first end 76 of the hub and the disk 42 being loosely disposed in the groove 58. Locking of the clutch 36 is initiated by sliding the hub 38 towards the carrier 40 causing the disk 42 to slide on the ramped surface 48. The increasing diameter of the ramped surface 48 expands the disk 42 as it moves towards the second end 79 of the hub 38 increasing friction between the disk 42 and the carrier 40. The friction force between the carrier 40 and the disk 42 decelerates the disk 42 causing relative rotation between the disk 42 and the hub 38. When the disk 42 and the hub 38 rotate relative to each other, the cams 68 and 70 cooperate to further radially expand the disk 42 increasing the frictional engagement with the groove 58 causing the clutch 36 to lock. FIG. 1 illustrates the clutch 36 in the closed state.

Traditional wedges clutch will not slip in response to excessively high torques. Instead, the friction force between the carrier 40 and the disk 42 will continue to increase until one or more of the components yield. Clutch 36 is designed to allow the clutch to slip when a threshold torque is exceeded. The carrier 40 has a split-groove design having a pair of groove halves movable relative to each other. The clutch 36 slips when the halves separate by a threshold distance. One groove half may be formed on the radially extending portion 52 and the other groove half may be formed on a sliding member 61. A resilient member 63 biases the groove halves together. The resilient member 63 may be designed to hold the groove halves together for a first range of torques through the clutch to maintain a minimum groove width and displace allowing the member 61 to slide to provide an increased groove width for a second range of torques through the clutch. This will be described in more detail below with regard to the embodiment shown in FIGS. 3 through 6.

Figure 3:
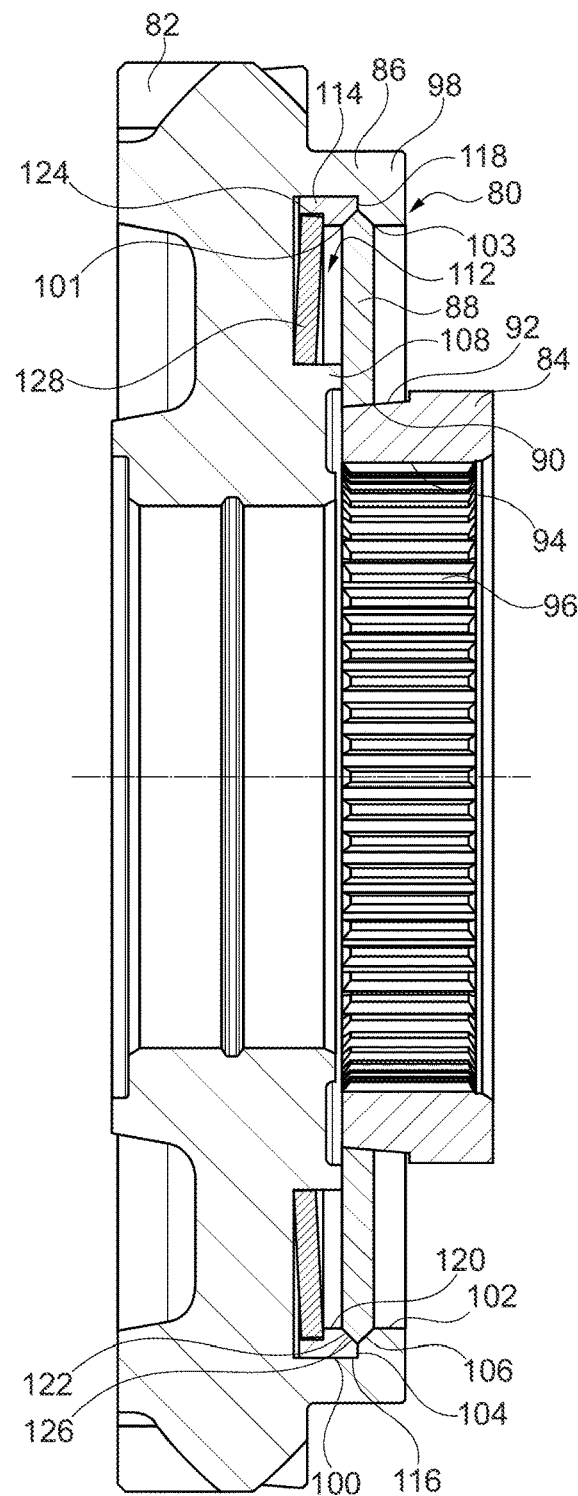
FIG. 3 is a side cross-sectional view of a wedge clutch for a ring gear.

Wedge clutches may be used in many different applications other than in a PTU. Wedge clutches may be used in any application that requires two or more rotating components to be selectively coupled together. FIG. 3 illustrates a wedge clutch 80 operable to selectively couple a ring gear 82 to a shaft. The wedge clutch 80 includes a hub 84 connectable to the shaft, a carrier 86 connected to the gear 82, and a disk 88 that frictionally engages between the hub and the carrier when the clutch is locked. In the illustrated embodiment, the carrier 86 is integrally formed with the gear 82. In other embodiments, the carrier 86 may be attached to the gear in a secondary process such as welding.

The hub 84 may include an outer side 90 defining a ramped surface 92 and an inner side 94 defining teeth 96. The teeth 96 cooperate with splines on the shaft to connect the hub 84 to the shaft. Similar to clutch 36, the ramped surface 92 has cams that engage with cams on the disk 88 to radially expand the disk when the clutch is being locked.

The carrier 86 may include an outer axially extending portion 98 and an inner axially extending portion 108 that cooperate to define a pocket 112 recessed into the gear 82. The outer portion 98 includes a first axially extending surface 100 and a second axially extending surface 102 that is inboard of the first surface 100. A radially extending surface 104 extends inwardly from the first surface 100 towards the hub 84. A chamfered surface 106 extends between the surface 102 and the surface 104.

A sliding member 114 is disposed in the pocket 112 with an outer side 116 seated against the surface 100. The sliding member 114 may be a ring. The sliding member 114 may include an end face 118, an inner side 120, and a chamfered surface 122 extending between the end face 118 and the inner side 120. The chamfered surface 122 is opposite the other chamfered surface 106 to define an annular groove 126 that circumscribes the disk 88. The groove 126 has a split-groove design in which a width of the groove is adjustable by axially moving the sliding member 114 along the surface 100. The width of the groove is the distance between the chamfered surface 122 and the chamfered surface 106 at the opening of the groove. In the illustrated embodiment, the width of the groove 126 is the distance measured between point 101 and point 103.

Figure 4A:
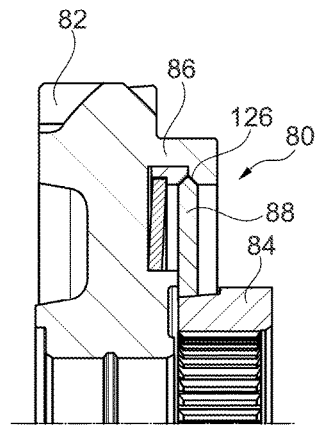
FIGS. 4A and 4B are partial cross-sectional views of the clutch of FIG. 3 in the open position.
Figure 4B:
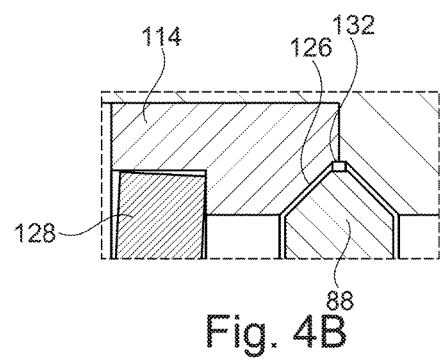

Referring to FIGS. 4A and 4B, the clutch 80 is shown in the open (or unlocked) state. In this state, the gear 82 and the hub 84 are decoupled and rotate independently of each other. In the open position, the outer edge 132 of the disk 88 is at least slightly spaced from the groove 126 and torque is not transmitted between the gear 82 and the disk 88.

Figure 5A:
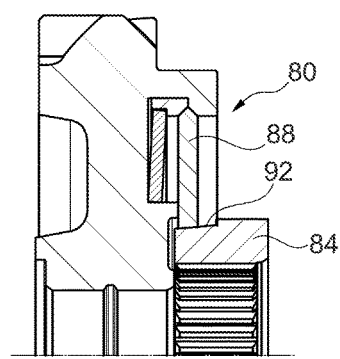
FIGS. 5A and 5B are partial cross-sectional views of the clutch of FIG. 3 in the closed position.
Figure 5B:
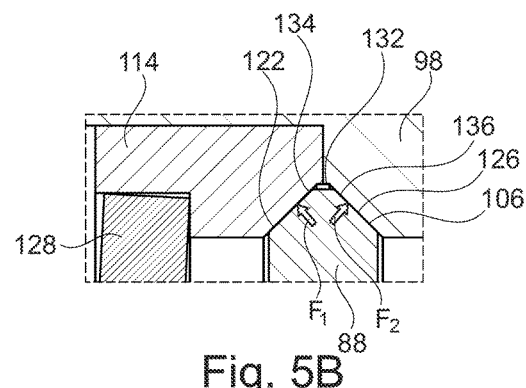

Referring to FIGS. 5A and 5B, the clutch 80 is shown in the closed (or locked) state. In this state, the ramped surface 92 and the cams have radially expanded the disk 88 forcing the outer edge 132 into frictional engagement with the groove 126 to transfer torque between the gear and the hub 84. The outer edge 132 may include a first angled surface 134 disposed against the chamfered surface 122 and a second angled surface 136 disposed against the chamfered surface 106.

The normal forces ($F_1$ and $F_2$) between the angled surfaces and the chamfered surfaces generate a friction force sufficient to lock the carrier 86 and the disk 88. The geometric configuration of the clutch 80 causes the forces $F_1$ and $F_2$ to increase as the torque transferred through the clutch increases. Due to this relationship, traditional wedge clutches will not slip in response to excessively high torques.

Instead, the friction force will continue to increase between the disk and the carrier until one or more of the components yield.

The split-groove design of wedge clutch 80 prevents clutch damage due to excessive torque. Unlike previous designs, in which the groove is machined from a solid piece of steel (or pieces, if the disk is multi-segment) and has a fixed width, the groove 126 is formed by the cooperation of two components that are movable relative to each other allowing the width of the groove to increase to permit slip when the torque exceeds a threshold value.

Figure 6A:
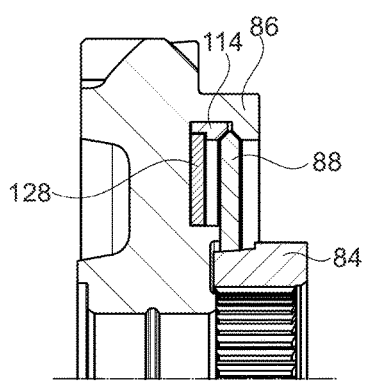
FIGS. 6A and 6B are partial cross-sectional views of the clutch of FIG. 3 in a slipping condition.
Figure 6B:
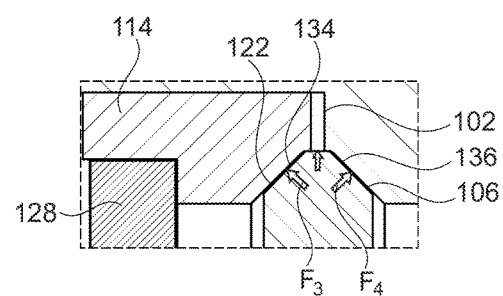

Referring to FIGS. 6A and 6B, the clutch 80 is shown in the closed state with slip occurring between the carrier 86 and the disk 88. The normal forces ($F_3$ and $F_4$) between the chamfered surfaces 106, 122 and the angled surfaces 134, 136 has overcome the force of the resilient member 128 and has slid the sliding member 114 away from the surface 102 increasing the width of the groove 126. As the width of the groove increases, the friction force between the groove 126 and the disk 88 is reduced permitting slip between the components to prevent damage to the clutch.

The resilient member 128 may be designed to hold the sliding member 114 against surface 102 for a first range of torques through the clutch to maintain a minimum groove width and displace allowing the member 114 to slide to provide an increased groove width for a second range of torques through the clutch.

This disclosure is not limited to the illustrated embodiments that show the outer race defining the groove and the inner race defining the ramped surface. In other embodiments, the placement of the hub and carrier are switched with the carrier being the inner race and the hub being the outer race. Here, the inner edge of the disk engages with a groove defined in the inner race, and the outer edge of the disk is disposed on the ramped surface of the outer race. Additional structure and operation of the wedge clutch is provided in the following documents, which are incorporated in their entirety by reference herein: U.S. patent application Ser. No. 15/388,297, filed on the same day as this disclosure; U.S. patent application Ser. No. 15/388,270, filed on the same day as this disclosure; U.S. patent application Ser. No. 15/388,213, filed on the same day as this disclosure; U.S. patent application Ser. No. 15/388,292, filed on the same day as this disclosure; and U.S. patent application Ser. No. 15/388,395, filed on the same day as this disclosure.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

What is claimed is:

1. A clutch comprising:
   a hub supported for rotation about an axis;
   a carrier supported for rotation about the axis and including a fixed portion and a sliding member that cooperate to define a groove, wherein movement of the sliding member changes a width of the groove; and
   a disk including a first edge disposed on the hub and a second edge disposed in the groove to frictionally engage the carrier when the clutch is locked; wherein the sliding member is biased such that the groove has a first width for a first range of torques between the disk and the groove and a second width that is greater than the first width for a second range of torques between the disk and the groove that is greater than the first range of torques.

2. The clutch of claim 1, wherein the fixed portion defines a first angled surface and the sliding member defines a second angled surface that cooperate to form the groove.

3. The clutch of claim 2, wherein the second edge defines a pair of angled surfaces that each engages one of the first and second angled surfaces of the groove when the clutch is locked.

4. The clutch of claim 1, wherein the fixed portion defines a radially extending surface and the sliding member is biased into engagement with the radially extending surface.

5. The clutch of claim 1 further comprising a resilient member engaging between the carrier and the sliding member to bias the sliding member.

6. The clutch of claim 5, wherein the resilient member is a diaphragm spring.

7. The clutch of claim 1, wherein the hub defines a ramped surface and the first edge is disposed on the ramped surface.

8. The clutch of claim 7, wherein the ramped surface has cams that engage with cams on the first edge to radially expand the disk in response to relative movement between the hub and the disk.

9. A clutch comprising:
   a first race supported for rotation about an axis;
   a second race supported for rotation about the axis;
   an annular member slidably seated against the first race, wherein the first race and the annular member each define an opposing surface, and the opposing surfaces cooperate to define a groove circumscribing the first race, and wherein the annular member is operable to slide along the first race to change a width of the groove;
   a resilient member arranged to bias the opposing surfaces toward each other; and
   a disk radially disposed between the first and second races and including a first edge disposed in the groove to frictionally engage the groove when the clutch is locked.

10. The clutch of claim 9, wherein the first race circumscribes the second race.

11. The clutch of claim 9 wherein the opposing surfaces are symmetrical about a radial axis.

12. The clutch of claim 9, wherein the annular member defines an end face that is biased against a radially extending surface of the first race.

13. The clutch of claim 9, wherein the second race defines an axially extending ramped surface and the disk defines a second edge disposed on the ramped surface.

14. A clutch comprising:
   a first race supported for rotation about an axis;
   a second race supported for rotation about the axis;
   an annular member slidably seated against the first race, wherein the first race and the annular member each define an opposing surface, and the opposing surfaces cooperate to define a groove circumscribing the first race, and wherein the annular member is operable to slide along the first race to change a width of the groove;
   a disk radially disposed between the first and second races and including a first edge disposed in the groove to frictionally engage the groove when the clutch is locked; and
   an actuator configured to move the first and second races relative to each other to lock the clutch.

15. A clutch comprising:
a hub supported for rotation about an axis;
a carrier supported for rotation about the axis and including an outer axially extending portion and an inner axially extending portion spaced apart to define a pocket, wherein the outer portion defines a first chamfered surface;
a sliding element disposed in the pocket against the outer portion and defining a second chamfered surface that cooperates with the first chamfered surface to define a groove facing the hub, wherein the sliding element is axially slidable relative to the outer portion to increase or decrease a width of the groove;
a resilient member radially disposed between the sliding element and the inner portion and biasing the first and second chamfered surfaces together; and
a wedge plate radially disposed between the hub and the groove, wherein the sliding element slides away from the first chamfered surface in response to a force between the second chamfered surface and the wedge plate exceeding a force of the resilient member permitting slip between the carrier and the wedge plate to limit torque transfer between the hub and the carrier.

16. The clutch of claim 15, wherein the sliding element is disposed against an axially extending surface of the carrier that extends between a pair of first and second radially extending surfaces of the carrier, and the sliding element is biased against the second radially extending surface.

17. The clutch of claim 16, wherein the first chamfered surface extends from the second radially extending surface.

18. The clutch of claim 15, wherein the resilient member is a diaphragm spring.

19. The clutch of claim 15, wherein the sliding element is annular and is supported for rotation about the axis.

* * * * *